(12) United States Patent
Schulz

(10) Patent No.: US 6,611,511 B1
(45) Date of Patent: Aug. 26, 2003

(54) CELLULAR TELEPHONE COMMUNICATION SYSTEM USING SECTOR SPLITTING FOR IMPROVED PERFORMANCE

(75) Inventor: Mark Alan Schulz, Pleasanton, CA (US)

(73) Assignee: Cellco Partnership, Bedminster, NJ (US)

( * ) Notice: Subject to any disclaimer, the term of this patent is extended or adjusted under 35 U.S.C. 154(b) by 0 days.

(21) Appl. No.: 09/262,232

(22) Filed: Mar. 4, 1999

(51) Int. Cl.$^7$ .............................................. H04B 7/216
(52) U.S. Cl. ...................... 370/342; 370/342; 370/278; 370/328; 370/334; 455/561; 455/562; 455/103; 455/132
(58) Field of Search .................... 455/73, 500, 561, 455/88, 524, 103, 132, 562, 277; 370/328, 278, 334, 335, 350

(56) References Cited

U.S. PATENT DOCUMENTS

| | | |
|---|---|---|
| 4,128,740 A | 12/1978 | Graziano |
| 4,144,409 A | 3/1979 | Utano et al. |
| 4,144,411 A | 3/1979 | Frenkiel |
| 4,525,861 A | 6/1985 | Freeburg |
| 4,562,572 A | 12/1985 | Goldman et al. |
| 4,613,990 A | 9/1986 | Halpern |
| 4,670,906 A | 6/1987 | Thro |
| 4,704,734 A | 11/1987 | Menich et al. |
| 4,881,082 A * | 11/1989 | Graziano .................... 342/432 |
| 4,932,049 A | 6/1990 | Lee |
| 4,955,082 A | 9/1990 | Hattori et al. |
| 5,067,147 A | 11/1991 | Lee |
| 5,193,109 A | 3/1993 | Chien-Yeh Lee |
| 5,243,598 A | 9/1993 | Lee |
| 5,504,936 A | 4/1996 | Lee |
| 5,533,011 A * | 7/1996 | Dean et al. ...................... 370/18 |
| 5,590,404 A * | 12/1996 | Sato et al. .................. 455/53.1 |
| 5,596,329 A * | 1/1997 | Searle et al. ................. 342/374 |
| 6,006,113 A * | 12/1999 | Meredith ..................... 455/562 |
| 6,035,218 A * | 3/2000 | Oh et al. ..................... 455/562 |
| 6,057,806 A * | 5/2000 | Lopez ......................... 343/890 |
| 6,061,338 A * | 5/2000 | O ................................ 370/335 |
| 6,167,036 A * | 12/2000 | Beven ......................... 370/331 |
| 6,243,412 B1 * | 6/2001 | Fukawa ....................... 375/219 |
| 6,253,094 B1 * | 6/2001 | Schmutz ..................... 455/562 |
| 6,275,482 B1 * | 8/2001 | Jevremovic et al. ......... 370/334 |

FOREIGN PATENT DOCUMENTS

EP         0 359 535 A1     3/1990

\* cited by examiner

*Primary Examiner*—William Trost
*Assistant Examiner*—Stephen M. D'Agosta
(74) *Attorney, Agent, or Firm*—Gates & Cooper LLP

(57) ABSTRACT

The invention describes a method and apparatus for apparatus for controlling communications between a mobile cellular telephone and a cell of a cellular telephone network. The apparatus comprises a basestation, a duplexer, a first antenna and a second antenna. The basestation transmits and receives communications between the cell and the mobile cellular telephone. The duplexer is coupled to the basestation and separates transmitted communications from received communications at the cell. The first and second antennas are coupled to the duplexer, transmit signals from the basestation to the mobile cellular telephone and receive signals from the cellular telephone for the basestation, and are spatially diverse to allow a signal from the first antenna and a signal from the second antenna to be superimposed into a composite signal that is used for communications with the cellular telephone.

9 Claims, 4 Drawing Sheets

CELLULAR TELEPHONE COMMUNICATION SYSTEM USING SECTOR SPLITTING FOR IMPROVED PERFORMANCE

CROSS REFERENCE TO RELATED APPLICATIONS

This application is related to U.S. patent application Ser. No. 08/608,172, filed Feb. 28, 1996, for "DIGITAL MICROCELLS FOR CELLULAR NETWORKS," by William C. Y. Lee, which is a continuation of application Ser. No. 08/263,129, filed Jun. 21, 1994 and issued as U.S. Pat. No. 5,504,936, which is a continuation of Ser. No. 08/330,220, filed Oct. 27, 1994 and issued as U.S. Pat. No. 5,488,966, which is a continuation of application Ser. No. 08/052,636, filed Apr. 26, 1993, now abandoned, which is a continuation-in-part of application Ser. No. 07/679,521, filed Apr. 2, 1991, now issued as U.S. Pat. No. 5,243,598, and also related to U.S. patent application Ser. No. 08/914,428, filed Aug. 19, 1997, entitled "METHOD AND APPARATUS FOR INTELLIGENT MICROCELL AND ANTENNA SELECTION IN DIGITAL CELLULAR TELEPHONE SYSTEMS," by William C. Y. Lee, all of which applications are incorporated by reference herein.

BACKGROUND OF THE INVENTION

1. Field of the Invention

This invention relates in general to methods and devices for cellular telephone communications, and in particular to a method and apparatus for sector splitting in cellular telephone systems to improve performance.

2. Description of Related Art

Cellular telephone communications technologies has advanced rapidly in the last decade. A key advance in the development of cellular telephone communications is the advent of digital microcells, as described in U.S. Pat. Nos. 4,932,049 and 5,504,936, issued to Lee, both of which are hereby incorporated by reference herein. These patents describe the use of a plurality of contiguous cells, each cell with a master site and a plurality of zone sites defining communication zones, which are defined by a plurality of suitably positioned antenna sets within the periphery of the cell. Consequently, each zone has a transmitting and receiving means directionally configured to limit propagation of signals substantially to a zone within the boundaries of the cell.

The performance of cellular telephone systems, i.e., voice quality, coverage, and capacity, has been improved through the use of both intelligent microcells and beamswitching or beam-forming antennae defining communications zones. This may be accomplished by measuring the strength of the signal transmitted by the mobile telephone in each communication zone, and use that measurement to determine the location of the mobile cellular telephone. Thereafter, transmissions to that mobile cellular telephone are accomplished by selecting the antennae transmitting into the same communication zone that the mobile cellular telephone is located in. By substantially limiting transmissions into this particular communication zone, interference in other zones is minimized and capacity is increased.

Another major improvement in mobile cellular telephone technology involves the application of code division multiple access (CDMA) communication technologies. CDMA is a method wherein each user's transmissions are modulated by a different pseudo-random number (PN) code to distinguish the user's logical channel, instead of being assigned a different frequency channel or a different time slot. These PN codes are orthogonal or partially correlated to each other, so that it is possible to identify the user channel based on an analysis of the PN codes used in the transmission. As a result, more than one user can use the same frequency, so long as they each use different PN codes to modulate their transmissions.

CDMA is especially desirable if the communication channel is relatively noisy. This is because CDMA typically uses spread spectrum techniques that are tolerant to noise and multipath interference. As a result, CDMA allows more users to use more noisy frequency channels to make calls, thereby increasing the capacity of the cellular telephone system.

Another advantage of CDMA is that every cell uses the same set of wideband frequencies or channels. As a result, it is possible to have the closest co-channel separation, i.e., the ratio of the co-channel separation distance (D) and the cell radius (R) in a CDMA system could be equal to 2, whereas the ratio D/R for other communication methods is about 4.6.

A consequence of using the same set of wideband frequencies in every cell is that no frequency switching is required as mobile units move from cell to cell. Instead, as mobile units move from cell to cell, only the PN codes need to change. Such changes in the PN codes, instead of frequency, are referred to as "soft" hand-offs. As a result, there is an improvement in the performance of the cellular telephone system.

While intelligent microcell and adaptive antenna switching technologies have been successful, they do not take full advantage of the benefits offered by microcell cellular telephone technology. For example, the foregoing increases capacity and reduces noise and cost by modifying the transmission of signals from the cell to the mobile cellular telephone to reduce interference in other communication zones, but does nothing to reduce received noise from other extraneous sources that are not under the cellular telephone network's control. There is therefore a need in the art for improved methods to reduce these noise sources.

Further, advances in antenna technology have not been fully used in cellular telephone systems. Beam-switching and beam-forming antennas have not been heavily implemented in CDMA cellular telephone systems. A primary reason for this is that the PN code for each user is not detected at the RF (radio frequency) stage in order to determine the associated signal strength. As a result, the proper microcell zone or antenna beam cannot be selected by the signal strength. Thus, there is also a need in the art for microcell and antenna selection in CDMA cellular telephone systems.

SUMMARY OF THE INVENTION

To overcome the limitations in the prior art described above, and to overcome other limitations that will become apparent upon reading and understanding the present specification, the present invention discloses a method and apparatus for communicating within a cellular telephone network. The apparatus comprises a basestation, a duplexer, a first antenna and a second antenna. The basestation transmits and receives communications between the cell and the mobile cellular telephone. The duplexer is coupled to the basestation and separates transmitted communications from received communications at the cell. The first and second antennas are coupled to the duplexer, transmit signals from the basestation to the mobile cellular telephone and receive signals from the cellular telephone for the basestation, and are spatially diverse to allow a signal from the first antenna and a signal from the second antenna to be superimposed into a composite signal that is used for communications with the cellular telephone.

BRIEF DESCRIPTION OF THE DRAWINGS

Referring now to the drawings in which like reference numbers represent corresponding elements throughout.

DETAILED DESCRIPTION OF THE PREFERRED EMBODIMENT

In the following description of the preferred embodiment, reference is made to the accompanying drawings which form a part hereof, and in which is shown by way of illustration, a specific embodiment in which the invention may be practiced. It is to be understood that other embodiments may be used and changes may be made without departing from the scope of the present invention.

Figure 1:
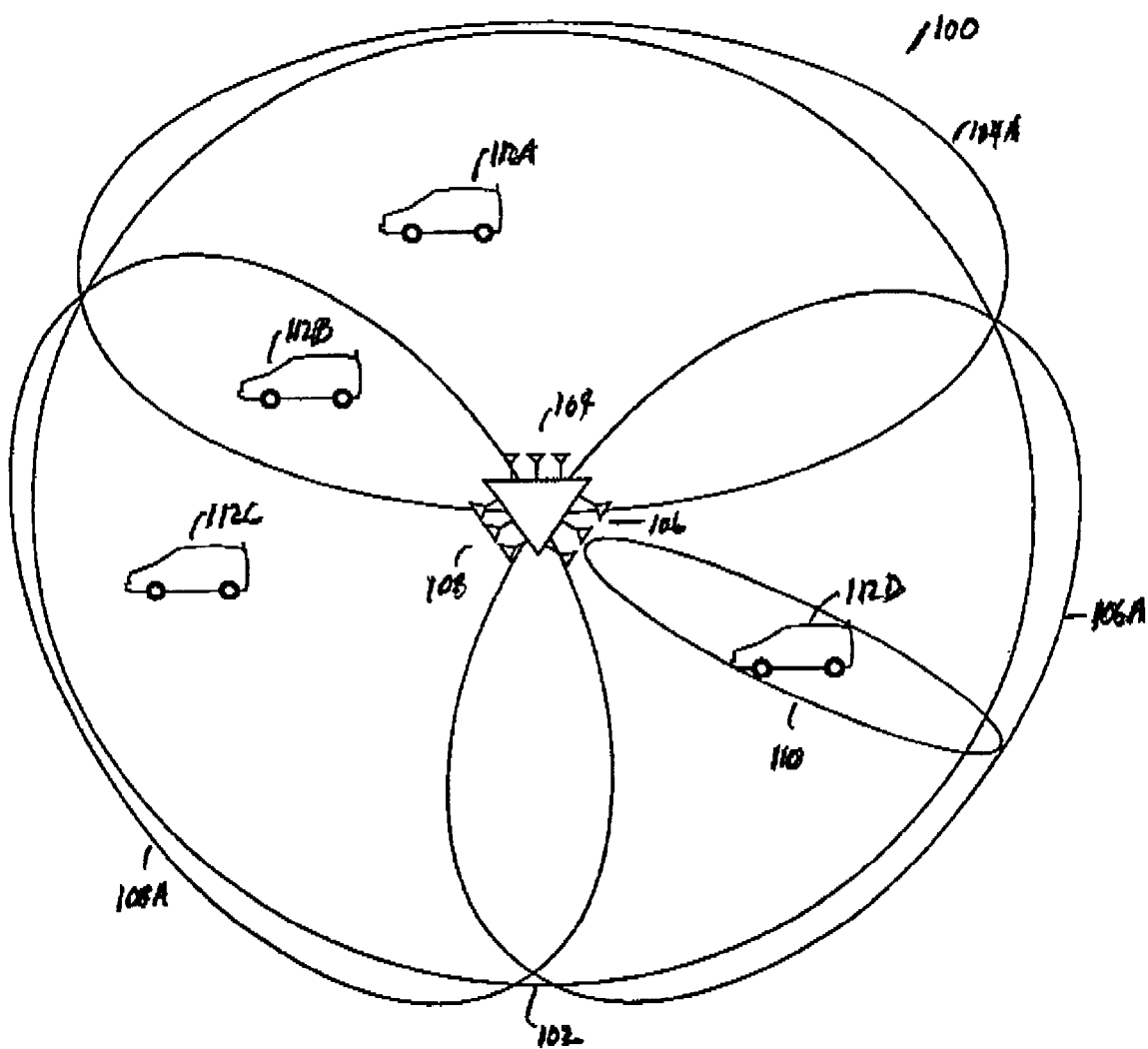
FIG. 1 is a diagram presenting an overview of the environment of the present invention.

FIG. 1 is a diagram presenting an overview of the present invention. A cellular telephone network 100 comprises a plurality of cellular telephone cells 102, which are serviced by one or more antennae 104, 106, and 108. By virtue of the transmission and/or reception characteristics of the antennae 104, 106, and 108, communication sectors or zones 104A, 106A, and 108A are defined within the cell 102. These zones may be defined by the reception characteristics of the antennae 104, 106, and 108, and associated equipment, the transmission characteristics of the antennae 104, 106, and 108 and the associated equipment, or both. In general, the boundaries of the communication zones 104A, 106A, and 108A will also be determined from other variables such as surrounding terrain, and interference from other signal sources. In one embodiment of the present invention, the scope of communication zones can 104A, 106A, 108A and 110A can also be determined by the reception capability and characteristics of the mobile cellular telephone 112, which can be obtained by measurement or by message transmission from the mobile cellular telephone 112.

Antennae 104, 106, and 108 can comprise a simple single antenna for transmitting and receiving communications from the mobile cellular telephone 112, or can comprise separate antennas for transmission and reception of the communications. Further, the antennae 104, 106, and 108 may comprise a single antenna, a phased array, or other multiple antenna constructs, including beam forming antennae, beam switching antennae, or other forms of antenna beam pattern constructs, which allow the antenna sensitive axis and other parameters such as beamwidth or gain to be physically or electronically commanded or controlled, thereby defining a beam forming antenna area 110 to service mobile units 112D in the cell 102.

Although not shown in FIG. 1, the cellular telephone network 100 also comprises other cells similarly described. Mobile telephone 112 may be in one or more communication zones 104A, 106A, and 108A of the cell 102 at any one time. For example, as mobile telephone travels within the cell 102, it may be initially found in communication zone 104A, as indicated by its position at 112A, subsequently located in communication zones 104A and 108A simultaneously, as indicated by its position at 112B, or in another single communication zone 108A, as indicated by position 112C.

Thus, antennae 104, 106, and 108, as well as antennas in different zones 102, can be used to communicate with mobile telephone 112. It is possible that mobile telephone 112 can be located within zone 102 such that antennas 104, 106, and 108 within zone 102 and antennas 104, 106, and 108 within a neighboring zone 102 can have their beam patterns superimposed, phase shifted, or otherwise altered to have multiple antennae 104, 106, and 108, multiple antennae 104, a single antenna 104, or antennae 104 from two cells 102, or any other combination of antennae, are used to communicate with mobile telephone 112. The illustration of FIG. 1 is not meant to limit the type or number of antennae 104, 106, and 108 that are used to communicate with mobile telephone 112.

TRANSMIT DIVERSITY

The sector or zone splitting concept of the present invention uses angle diversity, space diversity, and/or polarization diversity (from cell site antennae 104, 106, 108 to mobile telephone) to divide the zone 104, 106, 108 (also known as a sector of a cell 102) for the receive link, the transmit link, or both links.

Figure 2:
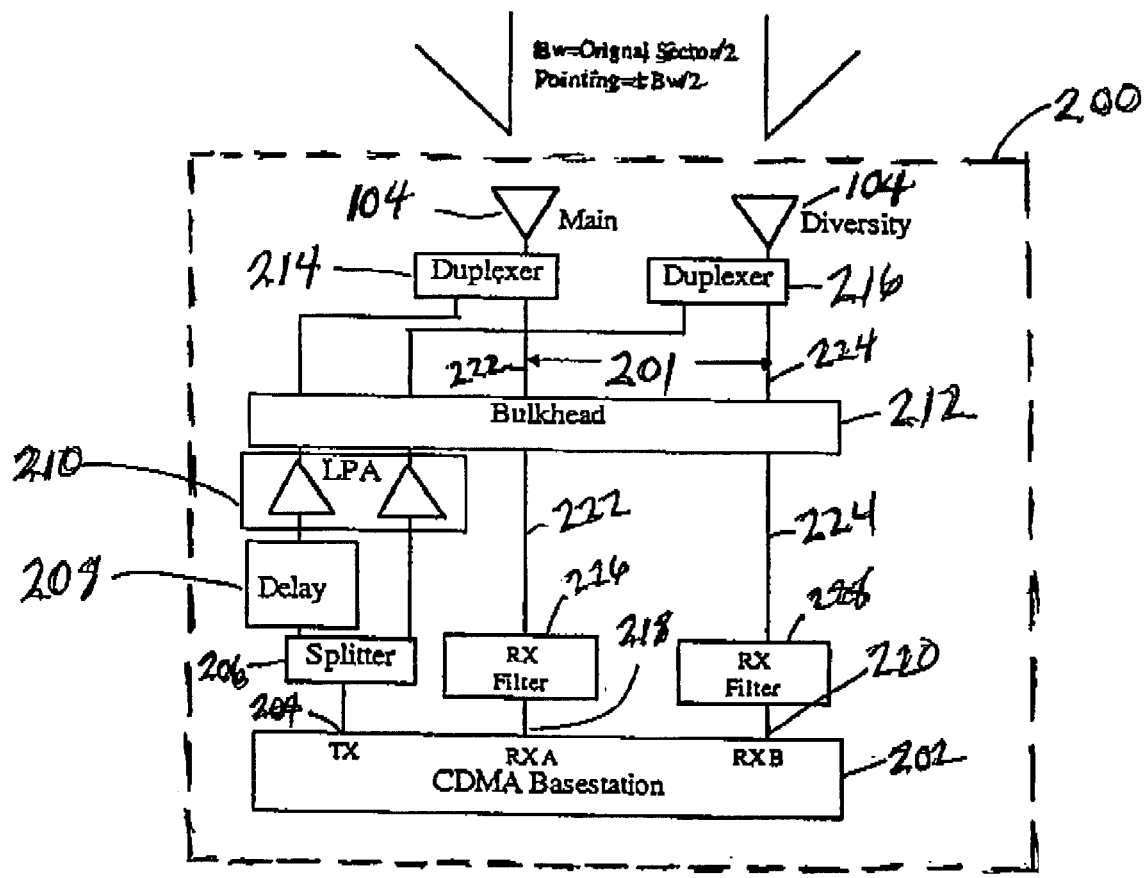
FIG. 2 is a block diagram of a first embodiment of the present invention.

FIG. 2 illustrates a block diagram of one embodiment of the present invention. At a cell site 200, antennae 104 (and antennae 106 and 108, not shown for clarity) are connected to electronics for communication with mobile telephones 112 within cell site 200. Each cell site is divided up into zones, such as zone 104A, which are serviced by antennae 104 for communication purposes.

Each of the two antennas, main antenna 104 and diversity antenna 104, have half the beamwidth of the original sector antenna 104 (beamwidth=original sector beamwidth/2). Each of the two antennas is also pointed off-boresight by half of this new beamwidth (pointing=beamwidth/2). This configuration accomplishes an angle diversity characteristic.

Transmit diversity can also be accomplished by spacing the two receiving antennas at a known distance apart. This distance, shown as distance 201, is typically ten feet, but can be more or less depending on the types of antennae 104 used at cell site 200. This will accomplish transmit diversity through space diversity.

Although shown as two antennas 104, antennas 104 can also be ports within a single antenna 104 with different polarizations to accomplish transmit diversity through polarization diversity.

Forward link communication, i.e., transmission from cell site 200 to mobile telephone 112, typically uses a CDMA basestation 202, with only one transmit port 204. The output from transmit port 204 is power divided into two signals by power splitter 206. One of the signals is delayed by a given time by delay device 208. This delay is typically 3–5 microseconds, to allow the mobile telephone 112 to properly combine both transmit signals. The 3–5 microsecond delay time is used to allow the rake receiver in mobile telephone 112 to use both fingers of the rake receiver without interference when the mobile telephone 112 is in the area between the beams of the antennae 104. The foregoing may be implemented with other delay values as well, depending on the cell site 200 electronics and the mobile receiver 112.

The delay of one of the outputs of splitter 206 is accomplished with coax, fiber optic delay lines, or with surface acoustic wave (SAW) devices. Both signals are then fed through the Linear Powered Amplifier (LPA) 210 which amplifies the signals. The signals are then processed through the bulkhead 212. Bulkhead 212 is an interface for each signal for each mobile telephone to be sent through the duplexers 214 and 216. Bulkhead 216 can also be placed between duplexers 214 and 216 and antennas 104, or other locations within the system. The delayed signal is sent through duplexer 214 and to antenna 104. The non-delayed signal is sent through a separate duplexer 216 and to the diversity antenna 104.

Although FIG. 1 illustrates duplexers 214 and 216 coupled to main antenna 104 and diversity antenna 104, it is possible to use separate antennas for the transmitter output 204 and the receive inputs 218 and 220 of CDMA basestation 202 instead of duplexing the antennae 104. Further, it is possible to use additional antennae or additional types of antennae, e.g., phased array antennae, for main antenna 104 or diversity antenna 104, or both.

For reverse link, i.e., mobile telephone 112 to cell site 200 communications, the received signals 222 and 224 from each antenna 104 enter into bulkhead 212. The two signals are then processed through receiver filters 226 and 228 before entering into the receiver ports at CDMA basestation 202.

The reverse link of the present invention provides a gain of approximately 3 dB over a single antenna 104 system, since each antenna 104 sees one-half of the number of interfering mobile telephones 112 than before the sector 104A was divided. Further, the forward Eb/No link benefits from angle diversity, provided by distance 201, by approximately 1–6 dB depending on the environment. The LPA 210 requirements are also 3 dB less for the present invention than for current systems, because each antenna 104 transmits half the previous power to maintain the same effective radiated power (ERP) as the original full sector antenna 104.

Multi-way Sector Splitting

Figure 3:
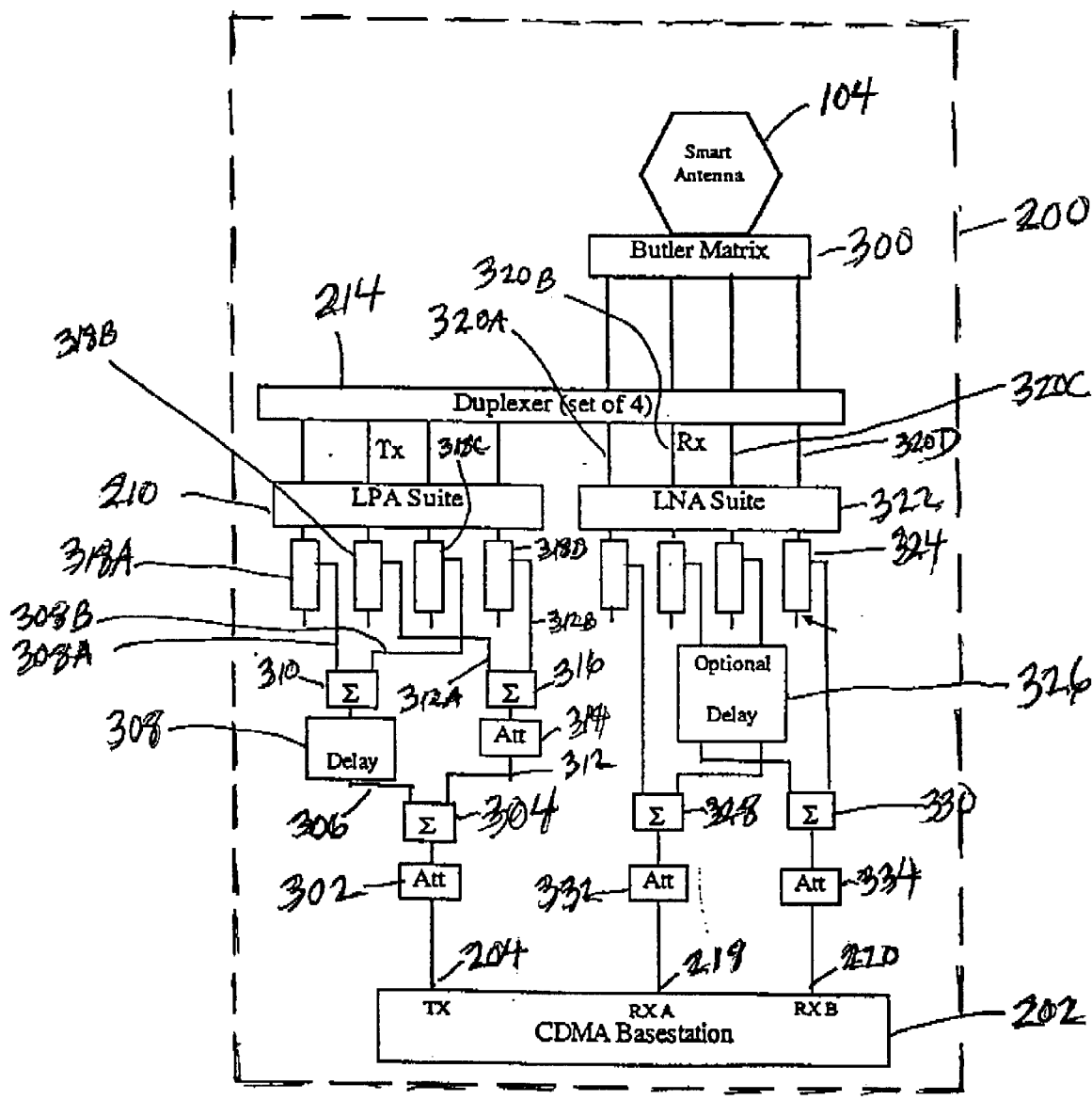
FIG. 3 is a block diagram of a second embodiment of the present invention.

FIG. 3 illustrates a block diagram of a second embodiment of the present invention. Although two-way sector splitting, as shown with respect to FIG. 2 above, provides benefits for both communications links in a cellular telephone system, splitting the sector even further will provide additional benefits, and allow the use of phased array, beam forming, and beam switching antennas within CDMA cellular telephone systems.

For example, if the sector 104A is divided by using four antenna beams instead of two, 6 dB higher antenna gains for each beam for the same total coverage area will be achieved. For low capacity conditions, e.g., thermal noise limited environments and environments where space diversity is equivalent to angle diversity, the Eb/No link gain for a four-beam system is also on the order of 6 dB, due primarily to an increase in antenna gain. For heavily loaded systems, e.g., interference limited systems, the gain is closer to 3 dB.

FIG. 3 illustrates a cell site 200 with a CDMA basestation 202 and an element array antenna 104. A element array antenna 104 is a phased array antenna where each antenna element within element array antenna 104 can be energized or excited by the same signal at different phases to create superposition effects at a desired angle and/or distance from element array antenna 104. Note that distance 201 is no longer present in FIG. 3, because the Butler matrix 300 "knows" the spacing of the antenna elements of element array antenna 104, and determines the antenna elements within element array antenna 104 that need to be energized at the proper phases to properly form or switch the beam pattern of element array antenna 104 to communicate with mobile telephone 112. Butler matrix 300, in conjunction with element array antenna 104, creates multiple zones or sectors within a cell, where each zone can be used as one or more communication links with a mobile telephone.

For forward link transmission, the signal from the CDMA basestation 202 transmitter port 204 is fed to an attenuator 302. From the attenuator 302, the signal is sent through a splitter 304 to divide the signal into two signals. One of the two signals, signal 306, is sent through a delay 308, typically a 3–5 microsecond delay, before entering into another splitter 310. The other signal, signal 312, is sent through an attenuator 314 and through a splitter 316. The four resulting signals, 308A, 308B, 312A, and 312B, may be fed separately into couplers 318A–318D, typically 10 dB couplers, each of which also has an analog input port. If the system is a CDMA only system, couplers 318A–318D are not needed. The outputs from the couplers 318A–318D are fed into a Linear Power Amplifier (LPA) suite 210. The four outputs from the LPA suite 210 enter into the duplexer set 214, which couples the signals to the butler matrix 18. Note that the duplexer set 214 in the illustration is a set of four duplexers, one duplexer for each of the four beams of the element array antenna 104. If element array antenna 104 had 100 beams, duplexer set 214 would have to include at least 100 duplexers. The Butler matrix 300 processes the signals to be transmitted, e.g., adjusts phase and delay of each of the signals 308A, 308B, 318A and 318B, and feeds the signals to the element array antenna 104 for transmission. Although bulkhead 212 is not shown in FIG. 3, bulkhead 212 can be placed between Butler Matrix 300 and duplexer 214, or at other locations within the system where desired.

For the reverse link, signals received at the element array antenna 104 are fed to the butler matrix 300. The butler matrix 300 processes the signals, e.g., adjusts the phase and delay of each of the received signals, and sends the signals through the duplexer set 214. The outputs from the duplexer set 214, signals 320A–320D, are sent into a Low Noise Amplifier (LNA) suite 322. The signals from the LNA suite 322 are each fed into one of four couplers 324, typically 10 dB couplers, which have output ports for both analog and CDMA signals. Two of the resulting four CDMA signal outputs may be sent through an optional delay 326, typically a 3–5 microsecond delay.

Each of the delayed signals is then summed with one of the non-delayed signals through a combiner 328 and 330. The signal from the combiner 328 is attenuated by attenuator 332, and the signal from combiner 330 is attenuated by attenuator 334. The signal from attenuator 332 is sent to input port 218 on CDMA basestation 202, and the signal from attenuator 334 is sent to port 220 on CDMA basestation 202.

FLOWCHART

Figure 4:
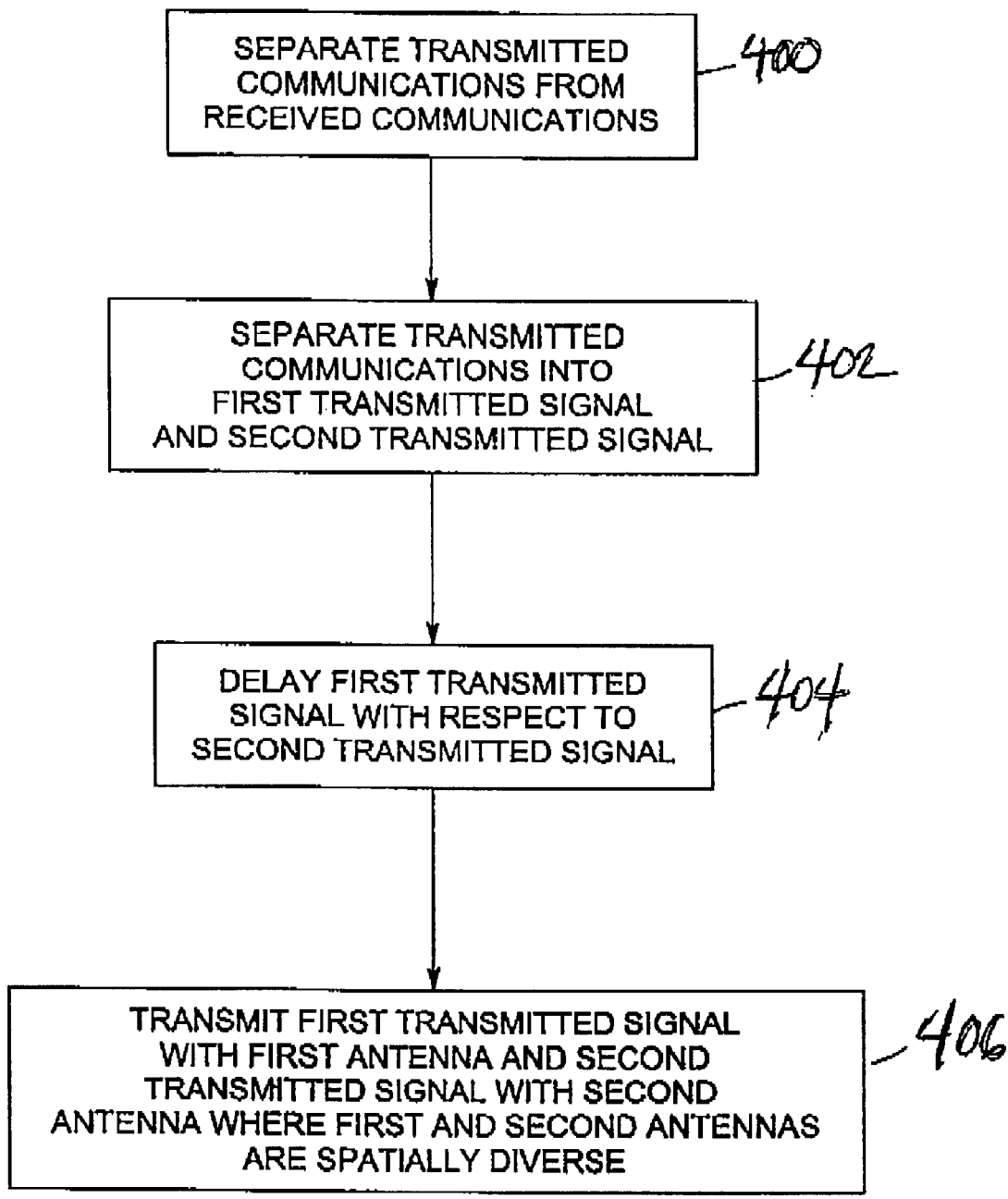
FIG. 4 is a flowchart illustrating the operation of the present invention.

FIG. 4 is a flowchart illustrating the steps used in performing the present invention.

Block 400 represents the step of separating transmitted communications signals from received communications signals at the cell.

Block 402 represents the step of separating transmitted communications signals into a first transmitted signal and a second transmitted signal.

Block 404 represents the step of delaying the first transmitted signal with respect to the second transmitted signal.

Block 406 represents the step of transmitting the first transmitted signal with a first antenna and the second transmitted signal with a second antenna, wherein the first antenna and the second antenna are spatially diverse to allow the first transmitted signal from the first antenna and the second transmitted signal from the second antenna to be superimposed into a composite signal that is used for communications with the cellular telephone.

CONCLUSION

This concludes the description of the preferred embodiment of the invention. Other embodiments are envisioned that do not depart from the scope of the present invention. For example, although basestation 202 is shown as a CDMA basestation, Time Division Multiple Access (TDMA), Frequency Division Multiple Access (FDMA), or analog communications may be used instead of or in conjunction with the CDMA communications schema shown. Further, multiple smart antennas from multiple cells may be electronically coupled to allow multiple antennas to transmit from multiple cells to communicate with one cellular telephone.

In summary, the present invention describes an apparatus and method for controlling communications between a mobile cellular telephone and a cell of a cellular telephone network. The apparatus comprises a basestation, a duplexer, a first antenna and a second antenna. The basestation transmits and receives communications between the cell and the mobile cellular telephone. The duplexer is coupled to the basestation and separates transmitted communications from received communications at the cell. The first and second antennas are coupled to the duplexer, transmit signals from the basestation to the mobile cellular telephone and receive signals from the cellular telephone for the basestation, and are spatially diverse to allow a signal from the first antenna and a signal from the second antenna to be superimposed into a composite signal that is used for communications with the cellular telephone.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An apparatus for controlling communications between a cellular telephone network operating on a plurality of communication channels and having a cell served by at least two antennae and a mobile cellular telephone, the apparatus comprising:

a basestation for transmitting and receiving communications between the cell and the mobile cellular telephone;

a duplexer, coupled to the basestation, for separating transmitted communications from received communications at the cell;

a first antenna, coupled to the duplexer, for transmitting signals from the basestation to the mobile cellular telephone and for receiving signals from the mobile cellular telephone for the basestation;

a second antenna, coupled to the duplexer, for transmitting signals from the basestation to the mobile cellular telephone and for receiving signals from the mobile cellular telephone for the basestation;

wherein a signal from the first antenna and a signal from the second antenna are superimposed into a composite signal that is used for communications with the mobile cellular telephone.

2. The apparatus of claim 1, wherein the first antenna and the second antenna are elements of a phased array antenna.

3. The apparatus of claim 1, wherein the first antenna and the second antenna have overlapping beam patterns.

4. The apparatus of claim 1, wherein the signal transmitted by the cell is divided into a first transmitted signal and a second transmitted signal.

5. The apparatus of claim 4, wherein the first transmitted signal is delayed with respect to the second transmitted signal for ease of combining the first transmitted signal and the second transmitted signal at the mobile telephone.

6. The apparatus of claim 1, wherein the basestation is a CDMA basestation.

7. The apparatus of claim 1, wherein the first antenna and the second antenna are pointed to at least partially overlap a beam pattern of the first antenna and a beam pattern of the second antenna.

8. The apparatus of claim 1, wherein the first antenna transmits a first signal with a first polarization, and the second antenna transmits a second signal with a second polarization.

9. A method of communicating with a mobile telephone in a cellular telephone network operating on a plurality of communicating channels, the cellular telephone network comprising a cell served by at least two antennae, the method comprising the steps of:

separating transmitted communications signals from received communications signals at the cell;

separating transmitted communications signals into a first transmitted signal and a second transmitted signal;

delaying the first transmitted signal with respect to the second transmitted signal;

transmitting the first transmitted signal with a first antenna and the second transmitted signal with a second antenna, wherein the first antenna and the second antenna are spatially diverse to allow the first transmitted signal from the first antenna and the second transmitted signal from the second antenna to be superimposed into a composite signal that is used for communications with the cellular telephone.

\* \* \* \* \*